United States Patent
Schlipf et al.

(10) Patent No.: US 12,246,833 B2
(45) Date of Patent: Mar. 11, 2025

(54) SEALING DEVICE FOR COVERING AN APERTURE IN A WING PART

(71) Applicant: AIRBUS OPERATIONS GMBH, Hamburg (DE)

(72) Inventors: Bernhard Schlipf, Hamburg (DE); Atra Gemilang, Hamburg (DE)

(73) Assignee: AIRBUS OPERATIONS GmbH, Hamburg (DE)

( * ) Notice: Subject to any disclaimer, the term of this patent is extended or adjusted under 35 U.S.C. 154(b) by 0 days.

(21) Appl. No.: 18/204,898

(22) Filed: Jun. 1, 2023

(65) Prior Publication Data
US 2023/0391444 A1 Dec. 7, 2023

(30) Foreign Application Priority Data
Jun. 2, 2022 (EP) .................................. 22176982

(51) Int. Cl.
*B64C 9/02* (2006.01)
(52) U.S. Cl.
CPC ...................... *B64C 9/02* (2013.01)
(58) Field of Classification Search
CPC ....... B64C 2009/143; B64C 9/02; B64C 9/06; B64C 9/08; B64C 9/14; B64C 9/22
See application file for complete search history.

(56) References Cited

U.S. PATENT DOCUMENTS

| 5,039,032 A * | 8/1991 | Rudolph | B64C 23/069 |
|---|---|---|---|
| | | | 244/45 R |
| 9,296,464 B1 * | 3/2016 | Tuohimaa | B64C 9/16 |
| 2006/0249627 A1 | 11/2006 | Martin Hernandez | |
| 2009/0026317 A1 * | 1/2009 | Coughlin | B64C 9/16 |
| | | | 244/129.1 |
| 2015/0102161 A1 * | 4/2015 | Pitt | B64C 9/22 |
| | | | 244/1 N |
| 2018/0236858 A1 | 8/2018 | Lunn | |
| 2021/0024198 A1 | 1/2021 | Lorenz et al. | |

FOREIGN PATENT DOCUMENTS

| CN | 108609160 A | * 10/2018 | ............... B64C 9/22 |
|---|---|---|---|
| FR | 2 789 144 | 8/2000 | |
| WO | 2012/063046 | 5/2012 | |
| WO | 2017/216691 | 12/2017 | |

OTHER PUBLICATIONS

European Search Report cited in EP 22176982.1 mailed Nov. 8, 2022, 8 pages.

* cited by examiner

*Primary Examiner* — Philip J Bonzell
*Assistant Examiner* — Anna L. Gordon
(74) *Attorney, Agent, or Firm* — Nixon & Vanderhye P.C.

(57) ABSTRACT

A sealing device for covering an aperture in a wing part of an aircraft is disclosed having an interface section for fixedly mounting the sealing device to a surface of the wing part adjacent the aperture, a connecting section, and a cover section for covering at least a part of the aperture. The connecting section is arranged between the interface section and the cover section and connects the interface section and the cover section. The connecting section is adapted to resiliently hold the cover section in a predetermined orientation relative to the interface section to cover at least a part of the aperture. The cover section comprises a contact portion for contacting a surface of an actuation element that protrudes through the aperture.

17 Claims, 3 Drawing Sheets

SEALING DEVICE FOR COVERING AN APERTURE IN A WING PART

CROSS REFERENCE TO RELATED APPLICATION

This application claims priority to and incorporates by reference the entirety of European Application Number EP 22176982.1, filed Jun. 2, 2022.

TECHNICAL FIELD

The invention relates to a sealing device for covering an aperture in a wing part of an aircraft, a wing of an aircraft as well as an aircraft having such a wing and/or at least one sealing device.

BACKGROUND

Commercial or transport aircraft having fixed wings are usually equipped with high lift systems that comprise deployable high lift devices for selectively increasing the wing surface and the camber for start and landing procedures. These high lift devices often comprise leading-edge and trailing-edge devices. For example, a slat is arranged at a leading edge of the wing and is movable from a retracted position, in which the slat is flush with a fixed wing part, into a forward and/or downward direction through an actuation mechanism. In extended positions, the slat often creates a gap between itself and the fixed wing part.

The actuation mechanism is mainly located inside the fixed wing part and may comprise two curved support tracks or linkages that are spaced apart in a spanwise direction and coupled with the slat through lugs, knuckles, joints, or other coupling devices. The fixed wing part comprises apertures, into which the coupling devices reach when the slat is retraced, and through which the support tracks or linkages reach during an extension of the slat. The apertures may influence the aerodynamic behavior of the wing due to a leakage flow through the apertures from the high pressure lower wing surface to the low pressure upper wing surface.

Sealing devices for closing a part of the apertures are known. For example, WO 2012/063046 A1 shows a seal assembly for closing an aperture in an aerodynamic surface of a structure, the seal assembly comprising a track for attachment to the structure, and a retractable seal including a flexible substrate and a plurality of rods connected to the substrate, wherein at least one of the rods is mounted for running movement along the track, and the seal is moveable between an extended position and a retracted position by moving the at least one rod along the track accompanied by folding/unfolding of the seal substrate, and wherein the seal is biased to its extended position.

SUMMARY

The present invention contemplates an alternative sealing device for covering an aperture of a wing part of an aircraft at least partially, wherein the sealing device is mechanically simple, reliable, substantially maintenance-free and has a low weight.

A sealing device for covering an aperture in a wing part of an aircraft is disclosed, the sealing device comprising an interface section for fixedly mounting the sealing device to a surface of the wing part adjacent the aperture, a connecting section, and a cover section for covering at least a part of the aperture, wherein the connecting section is arranged between the interface section and the cover section and connects the interface section and the cover section, wherein the connecting section is adapted to resiliently hold the cover section in a predetermined orientation relative to the interface section to cover at least a part of the aperture, and wherein the cover section comprises a contact portion for contacting a surface of an actuation element that protrudes through the aperture.

The sealing device according to an exemplary embodiment thus mainly consists of three sections, i.e. the interface section, the connecting section, and the cover section. The three sections are attached together and are placeable at the wing part at an aperture for covering at least a part of it as explained in the following. The actuation element may be a track or a lever that reaches through the aperture to move a control surface coupled to the wing part. The wing part may be a fixed wing part of a wing, with which control surfaces are coupled.

The interface section is provided for attaching the sealing device to the wing part and provides a structurally fixed base for the cover section that is coupled with the interface section. Preferably, it may be placed at an inner surface of the wing part. However, it may also be placed at an outer surface of the wing part or it may even be integrated therein. The interface section allows an attachment of the sealing device preferably to the inner side of the wing part and thereby provides an interface for holding the cover section. A modification of the wing part is thus not required.

In a simple case, the interface section comprises a continuously closed surface that has a shape complementing the shape of the respective surface of the wing part, to which the interface section is attached, at the desired installation location. However, a continuously closed surface is not required and instead, the interface section may also comprise several distinct and separate attachment points that can be placed flush onto the respective surface of the wing part and be attached to it through rivets, bolts, or other fastening means, or through welding, gluing, or other fastening processes.

The interface section may be mounted directly adjacent to the aperture. The interface section may comprise an interface that is designed for holding the cover section near a delimiting edge of the aperture, such that the cover section can reach into the aperture for covering it.

The cover section serves for closing at least a part of the aperture. This is achieved through providing a covering surface that has a shape which conforms the shape of the respective part of the aperture. The outer contour of the cover section thus substantially corresponds to an aperture contour in a way that the cover section can be placed directly inside the aperture to create a substantially continuous, closed surface with the adjacent regions of an outer surface of the wing part. The cover section may comprise at least one closed surface that will be placed inside the aperture to face outwards, i.e. to a side where the air flow is to be expected in flight. It is further preferred if the cover section encloses a circumferential gap with the aperture.

The connecting section connects the interface section and the cover section in a resilient manner. The interface section and the cover section enclose the connecting section and the cover section is exclusively connected to the connecting section. When the interface section is attached to the respective surface of the wing part adjacent to the aperture, the interface section is placed near the aperture and the cover section is able to reach into the aperture and is held there. Due to the resilient behavior, the cover section may conduct a motion relative to the interface section. For example, a free end of the cover section, which is opposite to the connecting section, swivels about the connecting section. This allows to conduct compensation movements for preventing constraint forces or stresses that would damage the cover section. The sealing device according to the invention thus is able to compensate deformations of the wing part or the actuation mechanism due to aerodynamic loads and changes in the temperature.

For providing an optimum sealing function, the cover section has a contact portion. Preferably, it is provided at a side facing away from the connecting section. Thus it may be arranged at its free end, which is intended for contacting an actuation element, such as a track, that protrudes through the aperture. It may be feasible to design the connecting section and/or the cover section in a way that the contact portion always maintains a contact with a surface of the actuation element, such that an inwardly directed motion of the cover section, e.g. a fluttering motion, is prevented. When the actuation element is moved through an actuator and moves the respective control surface outwards, it may experience an increased load due to air flowing onto the control surface, such that the actuation element and/or supporting elements may be elastically deformed. Due to the cover section contacting the actuation element, it is able to follow this elastic deformation motion, while at the same time staying inside the aperture to cover it. Thus, a mechanically very simple, yet reliable and substantially maintenance-free sealing device is created that provides an excellent covering function for an aperture while also compensating elastic deformation motions.

According to an exemplary embodiment, the connecting section is spring-elastic. The connecting section may allow a swiveling motion of the cover section relative to the interface section about an axis defined by the connecting section. A defined neutral position of the cover section relative to the interface section may be defined by a respective design of the connecting section. Due to its spring-elastic behavior, the connecting section always urges the cover section back into the neutral position, but does not prevent its motion. Thus, the part of the aperture to be covered by the cover section substantially remains covered, irrespective of air load induced motion of the actuation element and associated components.

According to an exemplary embodiment, the connecting section comprises an elongated shape having a hollow, round cross-section comprising two parallel longitudinal edges, wherein the interface section is connected to a first longitudinal edge, and wherein the cover section is connected to a second longitudinal edge. The connecting section itself is a simple part having a spring-elastic behavior. It may substantially comprise an Omega-shape. Preferably, it is designed in a way that the connecting section conducts only elastic deformations under all expectable forces acting onto the connecting section. This may be achieved by a suitable selection of a material, a suitable material thickness and a suitable curvature. A force from the cover section is transferred into the interface section only through the hollow cross-section of the interface section. Hence, during the force transfer, the cross-section elastically deforms and the distance between the first and second longitudinal edges may increase or decrease, depending on the transferred force and force direction. Due to the elastic behavior, the connecting section urges back into a neutral state by decreasing or increasing the distance between both longitudinal edges.

According to an exemplary embodiment, the cross-section of the connecting section is at least partially filled with an elastic material. This leads to improved spring-elastic characteristics of the connecting section and also absorbs mechanical shock loads. The elastic material may include rubber-like substances such as natural or synthetic rubber or silicone.

According to an exemplary embodiment, the contact portion has a rounded or curved cross-section and faces away from the aperture. The contact portion thus faces inwards, away from the aperture. Due to the rounded shape of the contact portion, a plurality of different contacting angles can be provided between the contact part and the actuation element. The contacting of the actuation element thus can be maintained even when the actuation element is moving relative to the aperture or the interface section. Preferably, the contact portion comprises a material or a coating, in particular a plastic material that improves a gliding behavior of the contact portion on the actuation element and reduces potential wear of the contact portion.

According to an exemplary embodiment, the connecting section or the cover section comprises a stopper, which is arranged beneath a covering surface of the cover section or the aperture in an installed state, and laterally protrudes over the covering surface, and wherein the connecting section is designed to abut an inner surface of a skin of the wing part if the cover section is pulled outwards. Air that flows over the respective wing part and the cover section may create a suctioning force that acts onto the cover section. Thus, in an installed state, the cover section may face a pulling force that pulls the cover section outwards. This means, that it is pulled into a direction, into which the covering surface faces. For preventing damage or excessive pulling, the stopper is provided. It is arranged either underneath the cover section or at the connecting section. The stopper may simply comprise one or more surfaces that abut the inner surface of the skin of the wing part if the cover section exceeds a tolerable motion. In a simple case, the stopper may be a rod or pin that extends underneath the covering surface and remains in a predetermined distance to the inner surface of the skin. Only if a motion of the cover section exceeds a tolerable value, the rod may contact the inner surface of the skin. However, the stopper may also be integrally formed in the sealing device, for example in a part of the connecting section to which the cover section is attached. The connecting section may comprise a part or section that exceeds the width of the directly above aperture. If the connecting section is designed as described above, i.e. the hollow part having two parallel longitudinal edges, one of the edges may be dimensioned to be longer than the associated width of the aperture directly above. The stopper reliably prevents an excessive pulling onto the cover section.

According to an exemplary embodiment, the sealing device is manufactured as a single part. All sections described above are then integrally formed and an assembly is not required. This reduces the effort to produce the sealing device and potential failure sources.

According to an exemplary embodiment, the sealing device is manufactured from a sheet metal material or a fiber-reinforced plastic material. The workpiece, from which the sealing device is made, may be a flat, sheet-like component, which is formed to the desired shape. If a sheet metal material, such as an aluminium alloy, titanium or another suitable metal is used, the individual sections are created by cutting and bending the sheet metal material. If a fiber-reinforced plastic material is used, it may be based on a prepreg that is brought into shape and cured afterwards. Also, suitable fiber material arrangements may be laid into a mold, be infused with resin or another matrix material and cured/hardened. Suitable fibers may include carbon, glass, or aramid fibers, wherein the matrix material may be a duroplast or a thermoplast.

According to an exemplary embodiment, the cover section comprises a covering surface and angled edges extending from the covering surface to increase a dimensional stability of the cover section, and/or wherein the interface section comprises an attachment surface and angled edges extending from the attachment surface to increase a dimensional stability of the interface section. Since the covering and attachment surfaces are designed to conform the shape of the skin of the wing part, they may comprise a limited dimensional stability if the material thickness is comparably thin. For increasing the dimensional stability and reducing the material thickness for one or both of the sections, they may comprise angled edges that may extend away from the respective surface at an angle of about 90°. The angled edges extend inwards, i.e. away from the aperture or the skin of the actuation element. The interface section may comprise angled edges at all sides. An exception may be made at the side, where the connecting section is placed. The cover section may comprise angled edges mainly at sides of the cover section, which do not comprise the contact portion or the connection to the connecting section. The contact portion may comprise a shape that also supports the dimensional stability of the cover section by extending downwards from the covering surface.

According to an exemplary embodiment, the connecting section comprises a hinge for connecting the interface section and the cover section, wherein the connecting section comprises a torsion spring resiliently coupling the interface section and the cover section. This is an alternative approach to the above-mentioned integrally formed connecting section. Here, the connecting and spring function are provided separately.

The present disclosure further relates to a wing of an aircraft, comprising a fixed wing, at least one control surface movable relative to the fixed wing, and at least one sealing device according to any of the preceding claims, wherein the fixed wing comprises at least one aperture for an actuation element that is coupled to the at least one control surface, and wherein the at least one sealing device is arranged at the fixed wing to cover at least a part of the respective aperture. The sealing device is arranged inside the fixed wing, such that the interface section is directly adjacent the aperture and such that the cover section reaches into the aperture.

According to an exemplary embodiment, the actuation element is a curved track, which is coupled with an actuator for being selectively extended out of and retracted into the fixed wing, and wherein the control surface is a leading-edge slat. For example, the motion path for the track has a curvature that coincides with the curvature of the track. The track may be realized in the form of a so-called "short curved track" (SCT).

According to an exemplary embodiment, the cover section is designed to maintain a gap to edges of the aperture to avoid a direct contact with edges of the aperture.

According to an exemplary embodiment, the at least one control surface comprises a seal extending around a connecting region of the actuation element and the at least one control surface on a rear surface of the at least one control surface, and wherein the seal is designed to contact the cover section in a retracted position of the at least one control surface. The dimension of the seal can be reduced in comparison with known seals of this type.

According to an exemplary embodiment, the sealing device has a preload with which the contact portion presses onto a surface of the actuation element that faces the at least one aperture. Thus, gaps between the covering section and the actuation element can be avoided and the cover section is not prone to fluttering or other movements.

The disclosure also relates to an aircraft comprising at least one wing according to the above and/or at least one sealing device according to the above.

BRIEF DESCRIPTION OF THE DRAWINGS

For an understanding of embodiments of the disclosure, reference is now made to the following description taken in conjunction with the accompanying drawings, in which.

DETAILED DESCRIPTION

Some embodiments will now be described with reference to the Figures.

Figure 1:
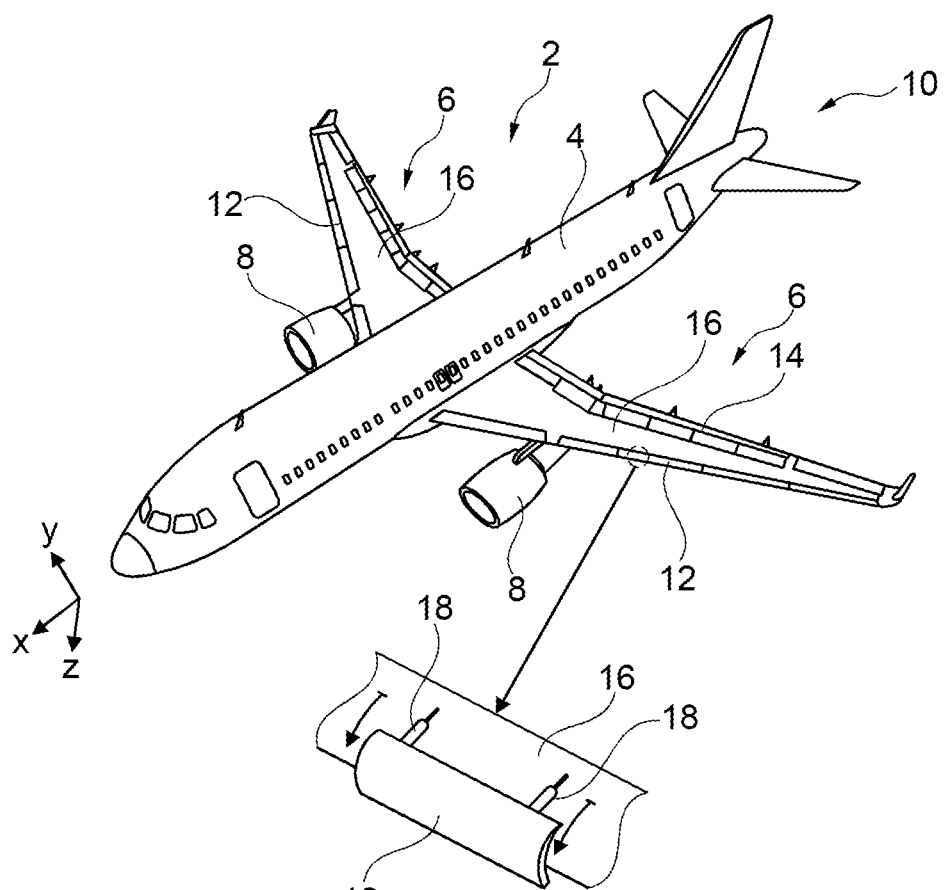
FIG. 1 shows an aircraft in a three-dimensional view.

FIG. 1 shows an aircraft 2 in a three-dimensional view. The aircraft 2 comprises a fuselage 4, two wings 6, engines 8 and a tailplane 10. The wings 6 exemplarily comprise leading-edge slats 12 and trailing-edge flaps 14 as control surfaces, which can be moved relative to a fixed wing part 16 for start and landing to increase the wing lift coefficient. For example, the leading-edge slats 12 can be moved forward along a longitudinal axis X and downward along a vertical axis Z. For this, exemplarily a pair of curved tracks as actuation elements is provided, which are advanced through an actuator inside the fixed wing part. When the slats 12 are moved from a retracted position, in which they are flushly arranged directly forward the fixed wing part 16, into an extended position, they are arranged at a distance to the fixed wing part 16, which is schematically shown in the detail view. The curved tracks pass through apertures 18 from inside the fixed wing part 16 outwards and in this position the apertures 18 are open to the airflow. The apertures 18 influence the aerodynamic characteristic of the aircraft 2 in the high-lift configuration and are to be minimized.

Figure 2:
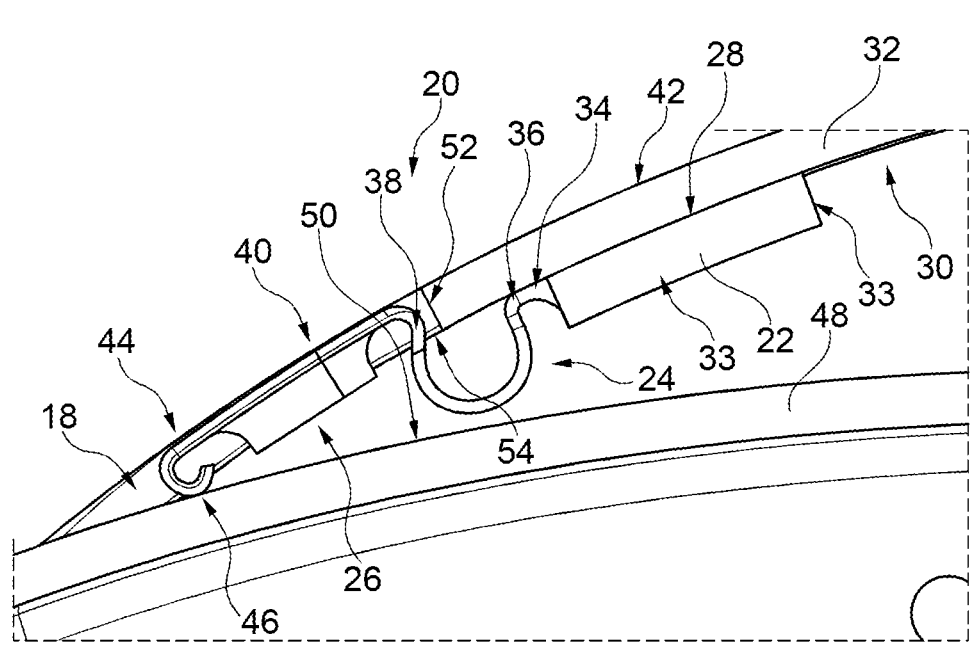
FIG. 2 schematically shows a sealing device in a sectional view.

FIG. 2 shows a sealing device 20, which is capable of covering at least a part of such an aperture 18. The sealing device 20 comprises an interface section 22, a connecting section 24, and a cover section 26. The interface section 22 comprises an attachment surface 28, which is flushly placed on an inner surface 30 of a skin 32 of the fixed wing 16. The attachment surface 28 has a shape that conforms the shape of the skin 32 and may be glued, welded, riveted, bolted, or otherwise fastened to the skin 32. It is fixedly arranged on the inner surface 30 and substantially does not move when the slats 12 are extended or retracted.

Exemplarily, the interface section 22 comprises angled edges 33, that extend away from the attachment surface 28 for increasing the dimensional stability of the interface section 22. Furthermore, the interface section 22 comprises an interface edge 34, which serves for holding the connecting section 24 at the position defined by the interface section 22.

The connecting section 24 comprises an elongated shape and has a hollow round cross section comprising two parallel longitudinal edges 36 and 38. Interface section 22 is connected to a first of the parallel edges 36 and 38, wherein the first longitudinal edge 36 is directly arranged at the interface edge 34. Due to the shape of the connecting section 24, and depending on the material used, the connecting section 24 has spring-elastic characteristics.

The cover section 26 is attached to a region near or directly at the second longitudinal edge 38 and comprises a covering surface 40 that is arranged to be flush with an outer surface 42 of the skin 32. It is held by the connecting section 24 in the aperture 18. At a side 44 facing away from the connecting section 24, the cover section 26 comprises a contact portion 46. In this embodiment, the contact portion 46 has a rounded or curved cross-section and faces away from the aperture 18.

Furthermore, a curved track 48 as an actuation element is schematically shown that extends through the aperture 18 from inside the fixed wing 16 to a position forward of the fixed wing 16. The curved track 48 may be moved through an actuator, which is not shown herein, wherein the motion path exemplarily coincides with the curvature of the curved track 48. The contact portion 46 rests on an upper track surface 50, such that it follows a potential elastic deformation of the track 48 and thus closes the aperture 18 as efficiently as possible. It is conceivable that the connecting section 24 is pretensioned in a way that the contact portion of 46 always urges onto the track surface 50 and thus, for example, avoids a fluttering motion. Also, by the pretension, the cover section 26 counteracts suctioning forces that act outwardly.

In this exemplary embodiment, a part of the cover section 26 that faces a rearward aperture edge 52 maintains a small gap 54 to the aperture edge 52. The sealing device 20 may thus compensate manufacturing induced dimensional tolerances of the aperture 18 and the aerodynamic surface 32. The same applies to lateral edges 56 visible in FIGS. 3 and 4.

The sealing device 20 is exemplarily manufactured as a single part, wherein the interface section 22, the connecting section 24 and the cover section 26 are formed integrally in the sealing device 20. This is further apparent from FIG. 3, where the sealing device 20 is shown in a three-dimensional illustration. The seating device 20 may be made from a sheet metal material, or a fiber reinforced plastic material. In other possible embodiments not explicitly shown herein, the sealing device 20 may be made from separate parts that constitute the interface section 22 and the cover section 26, wherein the connecting section 24 has a hinge and a spring to provide the required, resilient behavior.

In flight, air flows over the outer surface 42 of the fixed wing part 16 and the cover section 26, which may lead to a suction force acting onto the cover section 26 and directed outwardly. In addition to the counteracting force of the connecting section 24, a stopper 58 is provided that prevents the cover section 26 to be pulled out of the aperture 18. For this, the connecting section 24, i.e. the second longitudinal edge 38, comprises a protruding portion that exceeds the respective dimensional extension of the aperture 18. In other words, the extension of the second longitudinal edge 38 exceeds the width of the aperture 18, such that the second longitudinal edge 38 cannot be pulled out through the aperture 18. Instead, it abuts the inner surface 30 of the skin 32 and prevents pulling the cover section 26 out.

Figure 3:
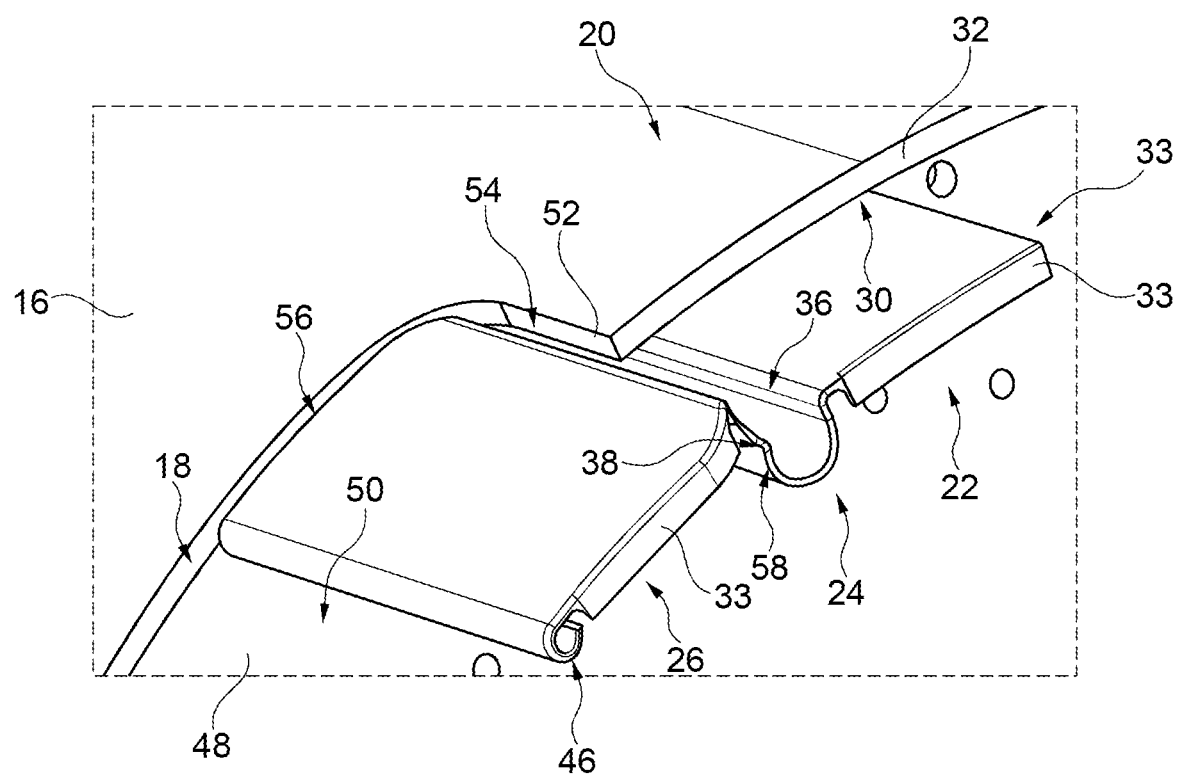
FIG. 3 schematically shows the sealing device in a three-dimensional view.
Figure 4:
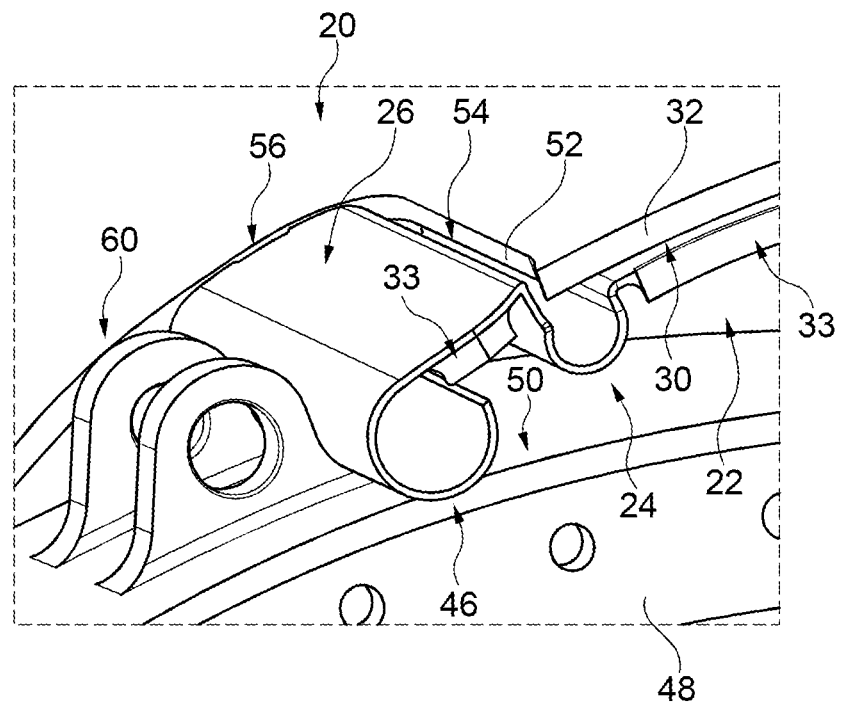
FIG. 4 shows a further sealing device in a three-dimensional view.

FIG. 3 shows the sealing device 20 on the track 48 that has a continuously curved and even surface 50 without any protrusions, indentations or attached components in the region of interest directly underneath the contact portion 46. However, FIG. 4 shows the track 48 that has a pair of lugs 60 attached to it. Here, the sealing device 20 is dimensioned to contact the upper surface 50 of the track 48 and, if desired, also the lugs 60. The curvature of the contact portion 46 is adapted to a respective curvature of the lugs 60. The sealing device 20 can simply be adapted to conform each possible track aperture 18 along the spanwise extension of the wing 6.

Figure 5:
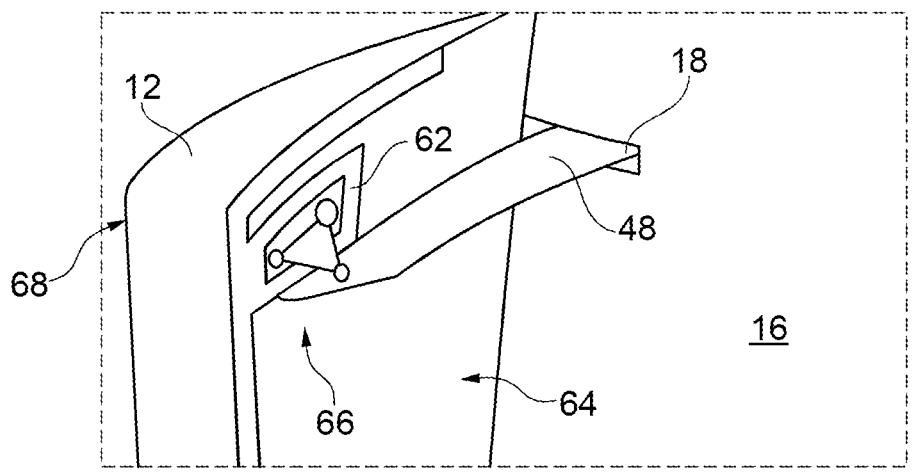
FIG. 5 shows a seal at a rear side of a slat.

FIG. 5 shows the slat 12 and the fixed wing 16 from underneath the wing 6. Here, a track 48 is shown to be extended and reaching through the aperture 18. The region, where the aperture 18 is located, is often referred to as "D nose". In a fully retracted position, the aperture 18 will be sealed through a seal 62, which is often referred to as "horseshoe seal", which is arranged at a rear surface 64 of the slat 12, extends along a spanwise axis and surrounds a connecting region 66, where the track 48 is connected to a knuckle or similar of the slat 12.

Figure 6:
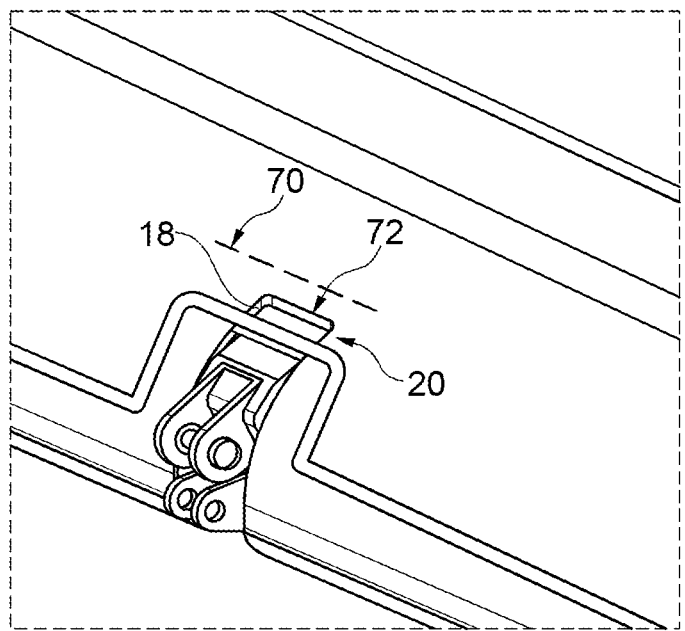
FIG. 6 schematically shows a sealing line of a horseshoe seal at a fixed wing part of the aircraft.

As illustrated in FIG. 6, providing sealing device 20 clearly reduces the required size of the horseshoe seal 62 and in particular, a required distance to a leading edge 68 of the fixed wing part 16 is reduced. In common designs, the horseshoe seal 62 extends to the dashed line 70, which is located downstream a rear edge 72 of the aperture 18. However, with providing the sealing device 20, the horseshoe seal 62 only needs to extend to a position directly above the cover section 26 forward the rear edge 72. The sealing device 20 thus acts as a counterpart for the seal 62. This reduces the required amount of sealing material, allows a larger contacting angle to the surface of the fixed wing 16 and thus improves the sealing function. At the same time, the air load acting onto the region enclosed by the seal 62 is reduced.

While at least one exemplary embodiment is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment (s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A sealing device for covering an aperture in a wing part of an aircraft, comprising:
    an interface section for fixedly mounting the sealing device to a surface of the wing part adjacent the aperture,
    a connecting section, and
    a cover section for covering at least a part of the aperture,
    wherein the connecting section is elastically deformable and disposed between the interface section and the cover section, and wherein the connecting section elastically connects the interface section at one end and the cover section at an opposing end,
    wherein the connecting section resiliently holds the cover section in a predetermined orientation relative to the interface section covering at least a part of the aperture, and wherein the cover section comprises a contact portion for contacting a surface of an actuation element that protrudes through the aperture.

2. The sealing device according to claim 1, wherein the connecting section is spring-elastic.

3. The sealing device according to claim 1, wherein the connecting section comprises an elongated shape having a hollow, round cross-section comprising first and second parallel longitudinal edges,
wherein the interface section is connected to the first longitudinal edge, and
wherein the cover section is connected to the second longitudinal edge.

4. The sealing device according to claim 3, wherein the cross-section of the connecting section is at least partially filled with an elastic material.

5. The sealing device according to claim 1, wherein the connecting section or the cover section comprises a stopper, wherein the stopper is arranged beneath the cover section or the aperture in an installed state, and
wherein the connecting section is designed to abut an inner surface of a skin of the wing part if the cover section is pulled outwards.

6. The sealing device according to claim 5, wherein the cover section comprises a covering surface and angled edges extending from the covering surface to increase a dimensional stability of the cover section, and/or
wherein the interface section comprises an attachment surface and angled edges extending from the attachment surface to increase a dimensional stability of the interface section.

7. The sealing device according to claim 1, wherein the sealing device is manufactured as a single part.

8. The sealing device according to claim 1, wherein the sealing device is manufactured from a sheet metal material or a fiber-reinforced plastic material.

9. The sealing device according to claim 1, wherein the connecting section comprises a hinge for connecting the interface section and the cover section, and
wherein the connecting section comprises a torsion spring resiliently coupling the interface section and the cover section.

10. A wing of an aircraft, comprising:
a fixed wing,
at least one control surface movable relative to the fixed wing, and
at least one sealing device according to claim 1,
wherein the fixed wing comprises at least one aperture for an actuation element that is coupled to the at least one control surface, and
wherein the at least one sealing device is arranged at the fixed wing to cover at least a part of the respective aperture.

11. The wing according to claim 10, wherein the actuation element is a curved track, which is coupled with an actuator for being selectively extended out of and retracted into the fixed wing, and
wherein the control surface is a leading-edge slat.

12. The wing according to claim 10, wherein the cover section is designed to maintain a gap to edges of the aperture.

13. The wing according to claim 10, wherein the at least one control surface comprises a seal extending around a connecting region of the actuation element and the at least one control surface on a rear surface of the at least one control surface, and
wherein the seal is designed to contact the cover section in a retracted position of the at least one control surface.

14. The wing according to claim 10, wherein the sealing device has a preload with which the contact portion presses onto a track surface that faces the at least one aperture.

15. An Aircraft, comprising at least one wing according to claim 10.

16. An Aircraft, comprising at least one sealing device according to claim 1.

17. A sealing device for covering an aperture in a wing part of an aircraft, comprising:
an interface section for fixedly mounting the sealing device to a surface of the wing part adjacent the aperture,
a connecting section, and
a cover section for covering at least a part of the aperture,
wherein the connecting section is deformable and arranged between the interface section and the cover section and connects the interface section and the cover section,
wherein the connecting section is adapted to resiliently hold the cover section in a predetermined orientation relative to the interface section to cover at least a part of the aperture, and
wherein the cover section comprises a contact portion for contacting a surface of an actuation element that protrudes through the aperture, wherein the contact portion has a circular cross-section and protrudes away from the aperture.

* * * * *